United States Patent
Minola

(10) Patent No.: US 8,033,367 B2
(45) Date of Patent: Oct. 11, 2011

(54) SEISMIC AND DYNAMIC AXIAL DAMPER APPLICABLE TO ELEMENTS PREFERABLY HAVING A CYLINDRICAL, RECTANGULAR OR SQUARED SECTION

(75) Inventor: Paolo Minola, Peschiera Borromeo (IT)

(73) Assignee: Snamprogetti S.p.A., San Donato Milanese (IT)

( * ) Notice: Subject to any disclaimer, the term of this patent is extended or adjusted under 35 U.S.C. 154(b) by 1079 days.

(21) Appl. No.: 11/769,422

(22) Filed: Jun. 27, 2007

(65) Prior Publication Data

US 2008/0006758 A1   Jan. 10, 2008

(30) Foreign Application Priority Data

Jun. 30, 2006   (IT) .............................. MI2006A1267

(51) Int. Cl.
*F16F 9/30* (2006.01)
(52) U.S. Cl. .............. 188/268; 188/33; 188/36; 188/67; 188/267; 188/378; 188/379; 188/380; 248/563; 248/583; 248/584; 248/589; 248/636
(58) Field of Classification Search .................. 188/268, 188/267; 248/560, 562, 580, 603, 70, 636–639, 248/692, 643, 200.1, 644; 267/136, 140, 267/140.11, 89, 91, 167, 170, 174, 179
See application file for complete search history.

(56) References Cited

U.S. PATENT DOCUMENTS

| | | | | |
|---|---|---|---|---|
| 2,376,277 A | * | 5/1945 | Rouy | 248/583 |
| 2,914,844 A | * | 12/1959 | Marshall et al. | 29/235 |
| 4,832,305 A | | 5/1989 | Asmundsson | |
| 5,816,559 A | * | 10/1998 | Fujimoto | 248/636 |
| 6,829,807 B2 | * | 12/2004 | Kim | 16/322 |

FOREIGN PATENT DOCUMENTS

| | | |
|---|---|---|
| DE | 41 11 557 A1 | 10/1992 |
| EP | 0 045 391 A2 | 2/1982 |
| JP | 06117373 A * | 4/1994 |
| WO | WO 2005/114035 A1 | 12/2005 |

* cited by examiner

*Primary Examiner* — Robert Siconolfi
*Assistant Examiner* — San Aung
(74) *Attorney, Agent, or Firm* — Oblon, Spivak, McClelland, Maier & Neustadt, L.L.P.

(57) ABSTRACT

An axial damper for elements having a cylindrical, rectangular or squared section, includes two identical fixing clamps, each fixing clamp including an upper part and a lower part connected to each other by a clamping device to be wound around the elements. At least two rafter-tie-rods are each connected at two ends thereof to the clamps. The rafter-tie-rods are placed equidistant from each other in the case of more than two rafter-tie-rods. The damper also includes two damping systems, each including two or more blocks of elastomeric material, with a pre-compressed elastic element interposed therebetween.

7 Claims, 5 Drawing Sheets

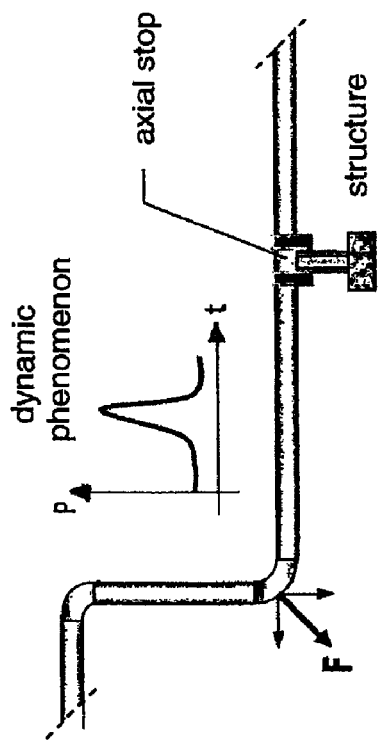
Fig.1
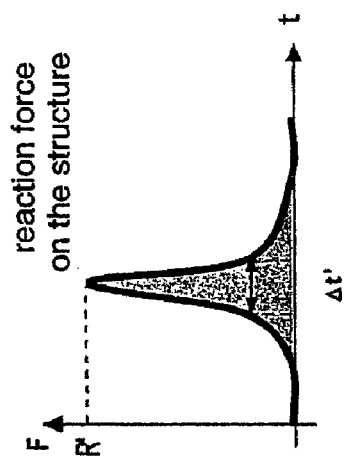
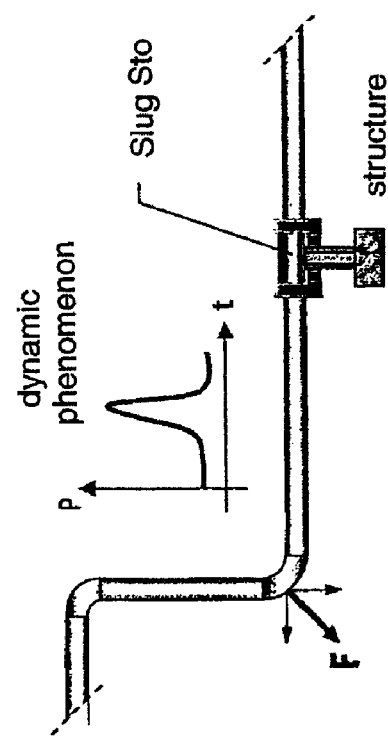
Fig.2
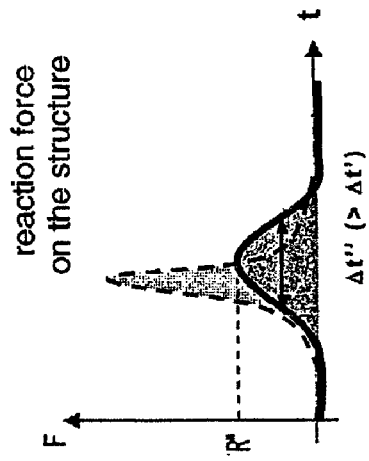

Sec. H - H

SEISMIC AND DYNAMIC AXIAL DAMPER APPLICABLE TO ELEMENTS PREFERABLY HAVING A CYLINDRICAL, RECTANGULAR OR SQUARED SECTION

BACKGROUND OF THE INVENTION

I. Field of the Invention

The present invention relates to seismic and dynamic dampers for axial loads which can be applied to elements preferably having a cylindrical, rectangular or squared section, such as, in particular, pipelines, tanks or supporting structures.

II. Description of Related Art

Supporting structures refer to structural components of civil or industrial constructions (pillars, beams, etc. ... ).

Dampers are devices which allow the effects generated by forces of a dynamic nature (a seism, for example) to be reduced on structures in general (civil, industrial, etc. ... ).

An equivalent axial damper does not currently exist on the market; there are axial-stoppers, whose function is to rigidly block the cylindrical element (normally pipelines) to the supporting structure: these consist of clamps or draw pieces welded to the tube, in contact with the structure. Their purpose is to axially block the movements (due to thermal expansions, for example) of the cylindrical element, completely transferring the relevant force to the supporting structure.

The main drawbacks of these types of supports derive from the fact that stress of a dynamic nature (such as, for example, water hammers and seisms) impulsively transfer their effects to the structure (FIG. 1), sometimes causing structural collapse (with damage to the supporting element and/or to the element supported).

BRIEF SUMMARY OF THE INVENTION

An axial damper has now been found, which allows said critical effects to be reduced, in addition to various other advantages described hereunder.

The axial damper, object of the present invention, which can be used for elements preferably having a circular, rectangular or squared section, essentially consists of:
- two identical fixing clamps (A), each consisting of an upper part (a) and a lower part (b) connected to each other by suitable clamping means (c), to be wound around said elements, said clamps preferably being reinforced by side rib structures (g);
- at least two rafter-tie-rods (B), preferably from 3 to 5, more preferably 4, each connected to the clamps (A) at the two ends (d), at the same distance in the case of more than two rafter-tie-rods (for example offset by 90° in the case of 4 rafter-tie-rods;
- two damping systems (C), each consisting of two or more blocks of elastomeric material (e), with a pre-compressed elastic element (f) interposed.

BRIEF DESCRIPTION OF THE DRAWINGS

FIG. 1 is a conventional axial stopper;
FIG. 2 is a conventional slug stop.

DETAILED DESCRIPTION OF THE INVENTION

The damping system (C) is preferably interposed between the lower part of the clamp (b) and the supporting structure of the element to be damped.

The blocks of elastomeric material (e) and the pre-compressed elastic elements (f) are preferably connected by a suitable metal supporting structure and protected by a suitable film from environmental aggressive elements (water, light, etc. ... ).

The clamping means used are preferably two or more screw bolts.

The fixing clamps (A) can generally be made of steel, whose characteristics must be the same as those of the damping element to which they are fixed (a tube, for example), in order to have the same thermal behaviour.

Figure 5:
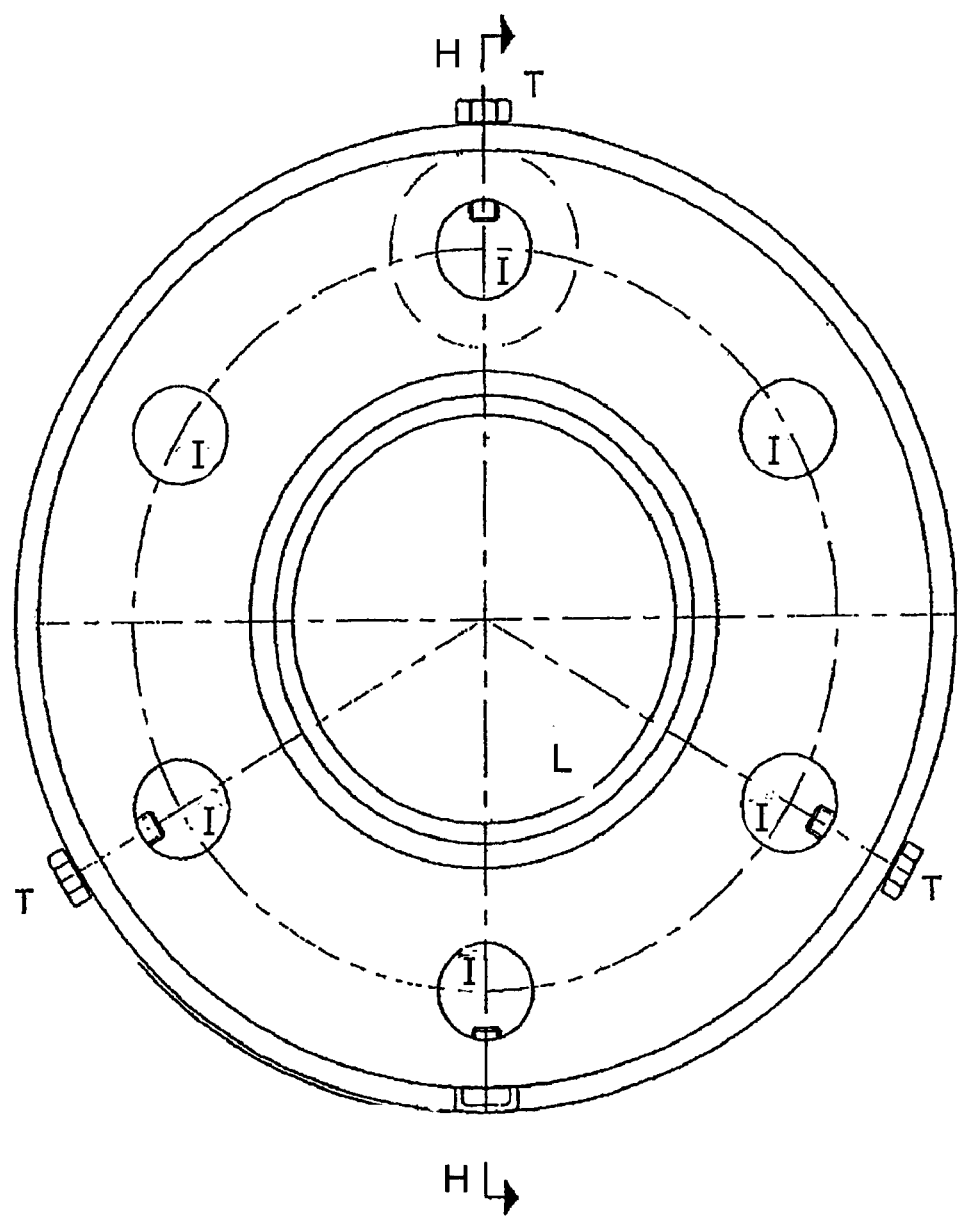
FIG. 5 is a top view of the elastic support according to an embodiment of the present invention commercially known as "CUPDISK©"
Figure 6:
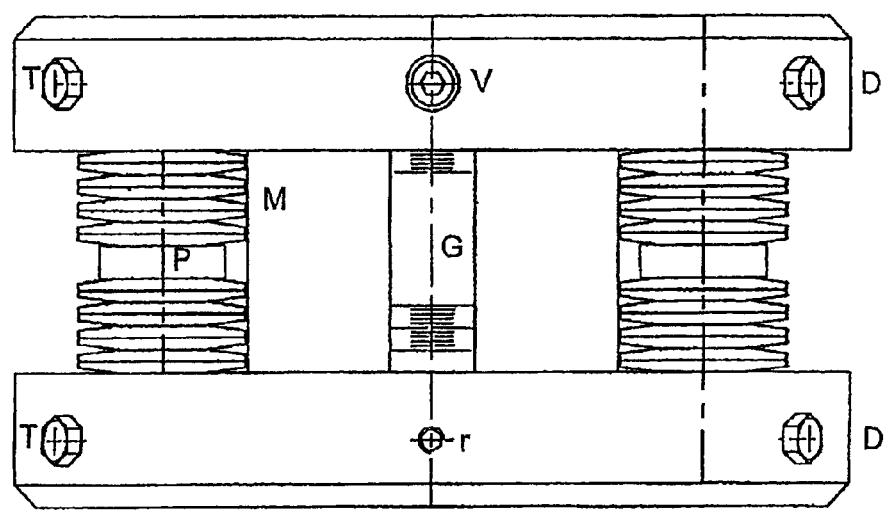
FIG. 6 is a side view of the elastic support according to an embodiment of the present invention commercially known as "CUPDISK©"
Figure 7:
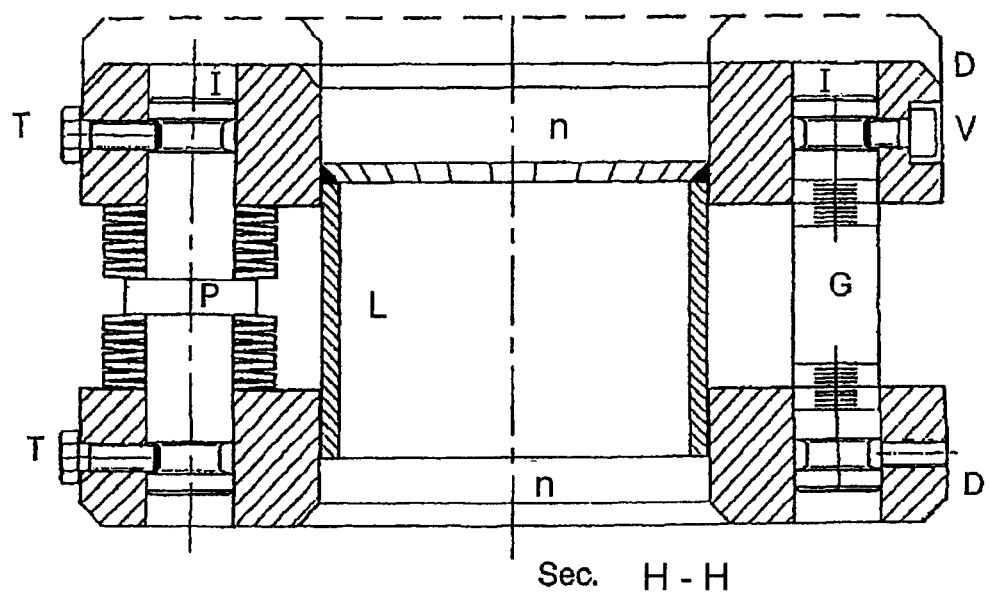
FIG. 7 is a sectional view of the elastic support according to an embodiment of the present invention commercially known as "CUPDISK©."

The pre-compressed elastic element is preferably the elastic support with a variable load described in patent application IT-2004002444 of the same Applicant and as shown in FIGS. 5-7, to which reference should be made for more detailed information, commercially known as "CUPDISK©" comprising:
- two equal supporting disks (D), each carrying a central axial hole (n), at least three axial holes (I), all or all except one, equidistant from each other and also with respect to the central axis, and at least three radial holes (r), each of them extending from the side surface until it reaches one of the axial holes (n) and all of them or all except one, at the same distance from each other;
- at least two pins (P) with relative piles of cup springs (M), for their insertion between the supporting disks (D), positioned by means of a number of axial holes (n), for each supporting disk, equal to the number of pins;
- a central sleeve (L) axially constraining the two supporting disks (D) in a radial direction, by means of the central holes (n);
- a pin with a graded scale (G), positioned between the supporting disks (D) by means of one of the axial holes (n) for each supporting disk (D);
- a permanent fixing means (V), fixing the pin with a graded scale (G), positioned in one of the radial holes (r) of one of the two disks.

Two or more of these elastic supports, situated in series with respect to each other, can be possibly used.

The damper according to the invention is completely parametrical: its dimensions therefore vary according to the element to be damped to which it is applied and according to the supporting structure.

In particular, in case of an element to be damped having a circular section (for example a pipeline) the inner radius of the clamps (A) will be the same as that of the cylindrical element to be damped, whereas the length of the tie rods (B) depends on the width of the supporting structure. The number, class and dimensions of the screw bolts (c) depend on the value of the acting force and on the dimensions of the clamps (A). The same can be said for the damping system (C) and its components (e and f).

The damper, object of the present invention, mainly has the purpose of reducing and damping the effect of a phenomenon of a dynamic nature.

The concept at the basis of its functioning is to increase the application time of the dynamic force, reducing its intensity, as represented in FIG. 2.

The presence of a elastic-viscous element, moreover, allows part of the fluid-dynamic energy to be dissipated.

The functioning sequence on an element having a circular section can be described as follows:

1. The force of a dynamic nature acts on the cylindrical structure (for example a pipeline) transferring dynamic energy;
2. the pipeline translates, dragging the damper;
3. One of the clamps (A) of the damper compresses one of the damping systems (C) which, upon acting, damps part of the energy, by hysteresis. *** Furthermore, the movement allowed by the damper to the pipeline, reduces the effect on the damper if it was rigid, but preserving the line from excessive deformations; the damper, in fact, has a safety run-end, shorter than the movement which would damage the tube.
4. The fluid-dynamic disturbance, in many cases, has an alternate course, i.e. it runs towards both directions of the cylindrical structure. In case the phenomenon is repeated, the damper acts in the same way as described above, operating the other two specular parts (A and C): the damper is bilateral.
5. The sequence 3 and 4 is repeated until the phenomenon runs out. By inserting the damper, the repetition of point 3 and 4 will take place in a smaller number than the traditional systems.

A further object of the present invention is the procedure for assembling the damper, according to the invention, on the element to be damped, comprising the following steps in this sequence:

insertion of the parts (a) and (b) of each of the two clamps (A) around the element to be damped;

pre-clamping of the clamping means (c) in order to connect the upper parts (a) of each clamp (A) to the relevant lower parts (b);

insertion of the two damping systems (C) between each of the clamps (A) and the structure supporting the element to be damped, each damping system being, in this phase, already pre-compressed, with relevant blocking devices inserted;

exact positioning of the clamps (A), with respect to the supporting structure, with zeroing of possible gaps, possibly acting on the regulation of the rafter-tie-rods (B);

clamping of the clamping means (c) until the desired value of the project pair is reached;

removal of the blocking devices of the damping system (C).

The main advantages in using the invention under subject are:

damping and reduction of the dynamic effects of mainly impulsive nature (seism water hammer, etc. . . . ).

series distribution on several structures of the forces both of dynamic and thermal nature. The traditional axial-stops can be placed singularly (i.e. not in series), as they do not allow the tube to translate with respect to the structure: consequently the whole load is concentrated on a single point. The nature of the damper under subject allows its installation in series along a cylindrical tract;

Safeguard of the cylindrical structure (a pipeline, for example) from unexpected dynamic effects, greater than the expected ones. The damper is dimensioned for the maximum dynamic load. If an event of greater intensity would happen, the pipeline would start to slide with respect to the clamps (A) with a movement in any case damped by the dynamic friction. This behaviour preserves the pipeline from tearing or mooring and, at the same time, prevents the collapse of the holding structure.

Zeroing of the gaps; the pre-compression induced by the damping system on the cylindrical constrained structure allows the possible gaps—which can occur because of inaccuracy in the assembling or in making it—to be zeroed. These gaps can be very harmful, in case of phenomena of dynamic nature, both of impulsive and vibratory type.

optimization of the yield of the damping system (C). The cold pre-compression of the elastomer block (e) induced by the pre-compressed elastic element (f), allows the damping system to be activated as soon as the instabilizing element occurs, thus avoiding the first part of the material curve, which is poorly efficient.

Assembling facilitated due to the alignment with the underlying structure.

No welding on the manufactured product, which is bolted to the cylindrical structure to constrain; welding is not required on the support or on the existing structure.

Easy to inspect and to upkeep, with the disassembly of the screw bolts alone.

interchangeability of the single components:

Low number of spare parts; the reduced number of peaces which form the support and their repetitiveness, allows a small stock of peaces in store.

Modular dimensions, strictly connected to the diameter of the cylinder.

Parameterization of the manufactured product; the support has a parametric identification code from which the main dimensions (length, maximum load, etc. . . . ) can be deduced.

Independence from the width of the underlying support structure. The manufactured product can be applied to any structure, with no dimensional limits.

reduced encumbrance of the single dismounted components when transported:

Intrinsic safety of the system. The presence of the tie rods (B) connecting the clamps (A) allows the transfer of an aliquot of the force from one clamp to the other, if a fault would happen in the functioning. If, for example, a clamp has not been tightened enough, could slide: the tie rods (B) activates the second clamp (A), remedying the inconvenient.

The damper of the present invention has no particular application limits; it can be installed on any structure, rectangular or square, subjected to dynamic phenomena.

The most frequent cases are listed herebelow:

Seismic event

Fluo-dynamic instability (water hammer, slug movement of a fluid)

Transitory for starting plants

Instantaneous intervention of mechanisms (for example, opening of safety valves)

Excessive reactions of thermic nature on the structures.

The structures to which the system can be mostly applied are:

Plant components (pipelines, columns, vessels, etc. . . . )

Civil structures (bridges, buildings, big structures, in general).

Figure 3:
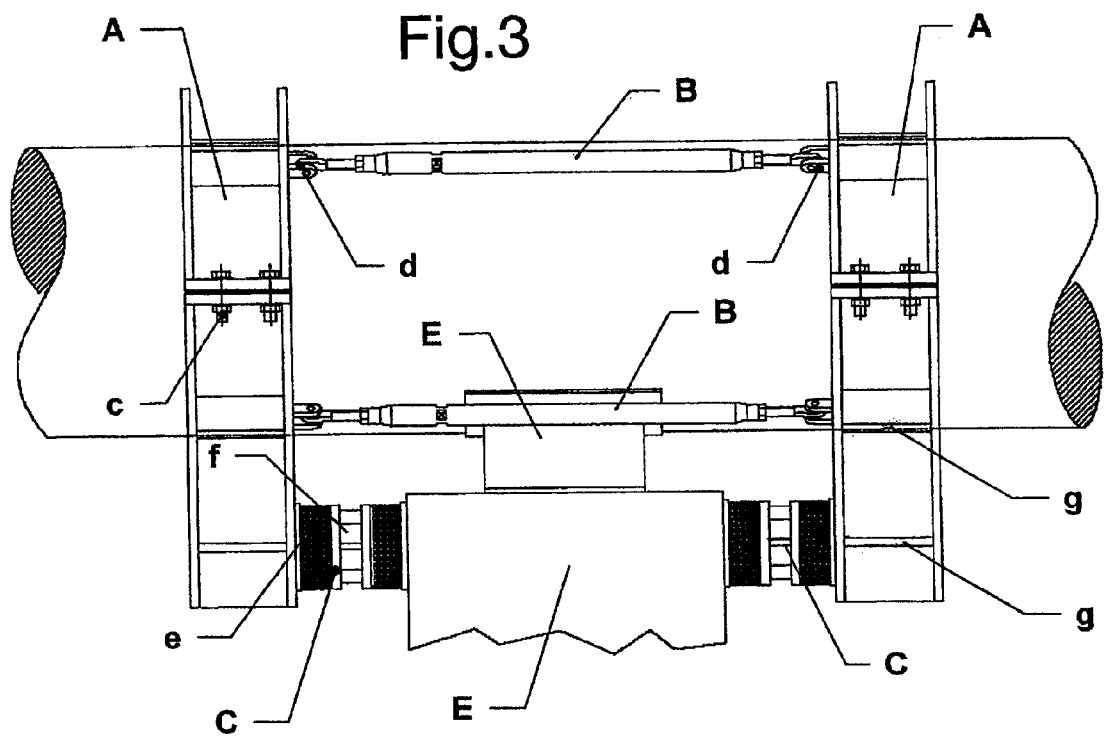
FIG. 3 is a front view of the damper according to an embodiment of the present invention.
Figure 4:
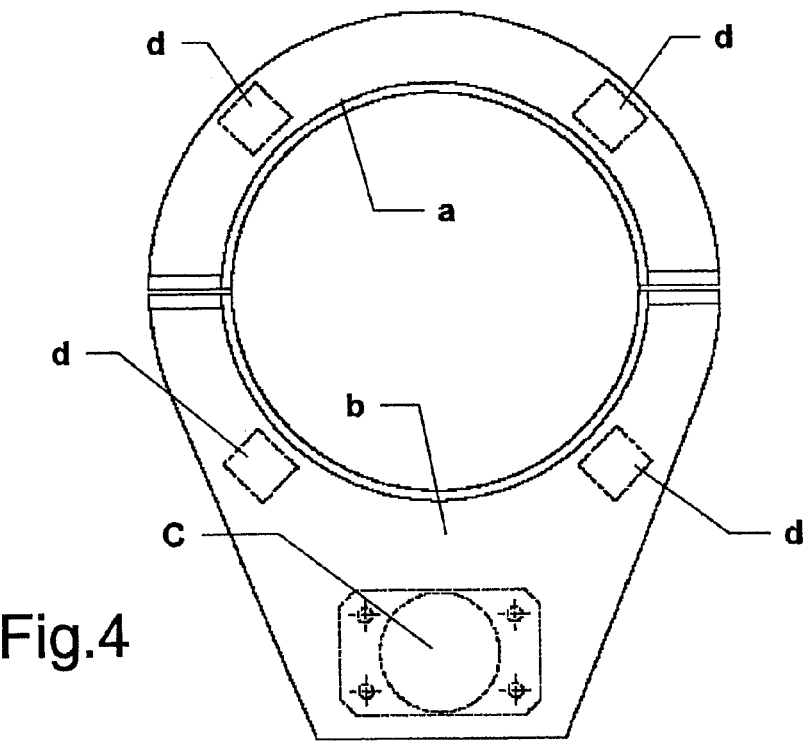
FIG. 4 is a sectional view of the damper according to an embodiment of the present invention.

It is now described an embodiment of the present invention with the aid of the FIGS. 3-4 which must not be considered as limiting the present invention.

The damper according the present invention is represented in FIG. 3 in a front view, whereas FIG. 4 shows a section view.

The damper comprises:

two equal fixing clamps (A), each having an upper part (a) and a lower part (b) connected one another by means of screw bolts (c), wrapped around to the circular section element (a pipeline);

four rafter-tie-rods (B), each of them connected at its two ends (d) to the clamps (A), at the same distance one another (90° offset));

two damping systems (C) each consisting of one or more blocs of elastomeric material (e), with the interposition of a pre-compressed elastic element (f).

The pre-compressed elastic element (f) is the elastic support with variable load, described in the patent application IT-2004002444 cited above.

The invention claimed is:

1. An axial damper for an element having a cylindrical, rectangular or squared section, comprising:

two identical fixing clamps configured to be attached around said element, each clamp including an upper part and a lower part connected to each other by clamping means;

at least two rafter-tie-rods disposed between the clamps on a periphery of the element and each connected at an end thereof to the clamps, the rafter-tie-rods being equidistant from each other in a case of more than two rafter-tie-rods; and two damping systems each associated with the lower part of a respective fixing clamp and including two or more blocks of elastomeric material, with a pre-compressed elastic element interposed therein, wherein the pre-compressed elastic element is an elastic support with variable load, comprising:

two identical supporting disks, each including a central axial hole and at least three axial holes, all or all except one of the holes equidistant from each other and also with respect to a central axis of the disks, and including at least three radial holes, each of the radial holes extending from the side surface until reaching one of the axial holes and all of the holes or all except one, at the same distance from each other;

at least two pins with relative piles of cup springs for insertion between the supporting disks, the pins positioned a number of axial holes in each supporting disk equal to the number of pins;

a central sleeve axially constraining the two supporting disks in a radial direction by means of the central holes;

a pin with a graded scale, positioned between the supporting disks by one of the axial holes for each supporting disk; and a permanent fixing means, fixing the pin with a graded scale, positioned in one of the radial holes of one of the two disks.

2. The axial damper as in claim 1, wherein the clamping means include screw bolts.

3. The damper as in claim 1, wherein the clamps are reinforced by side ribs.

4. The damper as in claim 1, further comprising three to five of the rafter-tie-rods.

5. The damper as in claim 4, further comprising four rafter-tie-rods.

6. The damper as in claim 1, wherein the blocks of elastomeric material and the pre-compressed elastic elements are connected by a metallic support structure and protected by film.

7. A method for assembling the damper as claimed in claim 1, comprising the following steps in sequence:

insertion of the upper and lower parts of each of the two clamps around the element to be damped;

pre-clamping of the clamping means to connect the upper parts of each clamp to the respective lower parts;

insertion of the two damping systems between each of the clamps and the structure supporting the element to be damped, each damping system being already pre-compressed, with relevant blocking devices inserted;

exact positioning of the clamps with respect to the supporting structure, with zeroing of possible gaps acting on a regulation of the rafter-tie-rods;

clamping of the clamping means until a desired value of a project pair is reached; and removal of the blocking devices of the damping system.

* * * * *